Patented Apr. 25, 1933

1,906,202

UNITED STATES PATENT OFFICE

WILLIAM McAFEE BRUCE, OF NEW YORK, N. Y., ASSIGNOR TO THE PERMUTIT COMPANY, OF NEW YORK, N. Y., A CORPORATION OF DELAWARE

PROCESS OF MAKING ZEOLITES

No Drawing.  Application filed September 27, 1928. Serial No. 308,888.

This invention relates to processes of making zeolites; and it comprises an economical method of preparing zeolites in the wet way from commercial materials wherein the solutions of said commercial materials are mixed in such proportions that a slightly alkalin final mother liquor results without the addition of any neutralizing agents, a solution of aluminum sulfate being admixed with a solution of commercial sodium silicate to produce a comparatively slow gelling liquid having a high ratio of silica to alumina and the ratio of silica being then lowered by an addition of sodium aluminate solution, the amount of sodium aluminate solution added being sufficient to leave the final liquor but slightly alkalin; all as more fully hereinafter set forth and as claimed.

The manufacture of synthetic zeolites for water softening purposes is now a well understood art. In part, these zeolites are made by dry or furnace methods and in part, by wet or precipitation methods. It is to this latter method of making zeolites that the present invention particularly relates.

In the water softening art, different zeolites are used for different purposes and the chemical composition and the physical properties vary considerably. Both are important. In deciding upon a zeolite for a particular purpose or a particular water, attention must be given not only to the exchange power per unit of volume or of weight but also to physical properties, such as porosity, hardness, etc. All these vary considerably in any given preparation with details of manufacture; and this is particularly true in making zeolites by wet methods.

Wet methods are based on the treatment of a solution of sodium silicate with either a solution of aluminum sulfate or one of sodium aluminate. Potassium silicate and potassium aluminate, although applicable, are not often used. In either way, there is formed a gel, which may or may not be a jelly. Many methods have been proposed, and several are in use, for converting these gels into hard, rigid granules suitable for use in a pervious bed softener. These methods include, in various orders, the steps of drying, washing and granulating the gel. Often, the gel is put through a filter press to remove some, or much, of the contained mother liquor and is then dried, after which the rest of the mother liquor is removed by washing. Sometimes, and particularly with jellies, no pressing is used and the jelly is directly dried. It is however, economical to express as much liquid as is possible without injury to the desired properties of the gel, thereby lessening the amount of water to be evaporated.

In making the gels, results are somewhat different with different methods of operation. If the reacting solutions are thoroughly mixed before precipitation or gelling can take place, which is always an object, the gels are homogeneous in composition and of uniform structure. The dried gels normally have a structure similar to the well known structure of silica gels and have ultra-microscopic pores. In the finished product, this structure gives relatively enormous internal area available for base exchange purposes. Because of the fineness of these pores, however, utilization of the total capacity is slow. In softening water, in regeneration and in rinsing, time must be given for penetration. The normal microscopic structure of the gels is not much interfered with in careful pressing. Lack of care in pressing, however, may develop strains and fractures in the cake, resulting in a product which will shatter unduly in granulation and break up in the softener.

Unless the solutions are uniformly mixed prior to gelling, uniform products cannot be obtained. For this reason, resort has been had to the use of dilute solutions to give more time for admixture. For reasons of economy, however, some prefer to work with much stronger solutions; using solutions as strong as can be uniformly admixed at the temperature practicable and under the conditions available at the manufacturing unit. Without proper admixture homogeneous products cannot be obtained and the product is apt to exhibit chalky spots, whether working with solutions strong enough to produce a jelly, or with solutions of weaker nature and giving a gel in a form representing only a fraction of the volume of the original solutions. The chalky spots, in many cases at least, are probably aluminum hydroxide or aluminum silicate.

In working with sodium aluminate and sodium silicate, the disssolved saline matter of the mother liquor is mainly caustic soda, but also may contain some silica. Sodium carbonate may form by absorption of $CO_2$ from the air. In working with aluminum sulfate and sodium silicate, the mother liquor contains sodium sulfate, a readily crystallizing substance which may be easily washed out of the gel.

The chemical composition of the zeolite is important. Zeolites contain combined water, soda, alumina, and silica in various ratios. Usually the soda-alumina molecular ratio is about $1:1$, but the alumina-silica ratio may vary considerably—ranging from about $1:2$ to as high as $1:15$ in materials which can be called zeolites. Furnace-made material has a relatively low silica content, the ratio of alumina to silica being of about the order of $1:3$ or $1:4$. Natural zeolites suitable for water softening, and the products prepared from them by treating processes, ordinarily have a somewhat higher silica content, the ratios being often $1:1:5$ to $1:1:6$. In a general way, zeolites with a silica content corresponding to the ratio $1:2$ are rather too soft. Preparations of satisfactory chemical and physical properties can be attained having a composition corresponding to the ratio $1:5$. Neither of the recited customary methods of making gelled zeolites gives a good control of the silica content and the alkaline method gives a waste of silica carried away by the mother liquors. In the present invention, control of the silica ratio is effected and certain other advantages are gained, by using a combination of the two methods. Solutions of sulfate of alumina and silicate of soda can be mixed without rapid gelation. But a high silica ratio in the product is inevitable, since commercial water glass solution contains a comparatively high, albeit variable, ratio of $SiO_2$ to $Na_2O$, while the ratio of $Al_2O_3$ to $SO_3$ in the aluminum sulfate is comparatively low. Since also the total $Na_2O$ in the zeolite must be supplied by the silicate, this automatically increases also the ratio of $SiO_2$ to $Al_2O_3$. In reacting on sodium silicate with sodium aluminate solution, in lieu of aluminum sulfate, lower silica ratios can be obtained, but there is a substantial loss of silica in the mother liquor. In the mother liquor, the ratio of $SiO_2$ to NaOH ordinarily varies between $1:0.5$ and $1:1$. In addition to its other disadvantage, the process is wasteful of alkali and of silica, or, which is the same thing, of sodium silicate. Moreover, the material is somewhat inferior in hardness.

It has been proposed to form water softening compositions by methods comprising addition of aluminum sulfate in solution to mixtures made of sodium silicate and sodium aluminate solutions; but these propositions have not been successful in practice. Compositions so made have been lacking in uniformity, in base exchange capacity, in ruggedness, etc., and they do not possess the properties generally desired in base exchange zeolites for use as regenerative water softening agents.

In the present invention, a solution of commercial aluminum sulfate is mixed with one of commercial sodium silicate. Fairly concentrated solutions can be employed and homogeneously admixed prior to precipitation or curding. No gelatin will occur in this mixture for some time and it will then tolerate admixture of sodium aluminate solution, giving sufficient time before gelling to effect homogeneous admixture by convenient and practical methods. By this process of adding a sodium aluminate solution to a liquid made by mixing aluminum sulfate and sodium silicate solutions, a product can be obtained with whatever silica content may be desired. The product is homogeneous.

In a practical embodiment of the present invention making an excellent microcellular gel having a $1:1:5$ ratio of soda, alumina and silica, with production of a nearly neutral mother liquor and economic utilization of chemicals, commercial aluminum sulfate in a 4.6° Bé. solution is mixed with a solution of commercial sodium silicate. The aluminum sulfate solution may contain 1.02 grams $Al_2O_3$ and 2.40 grams $SO_3$ per 100 c. c. This solution is admixed with a sodium silicate solution containing 2.94 grams $SiO_2$ and 0.90 grams $Na_2O$ per 100 c. c. Such solution has a density of 4.50 Bé. and represents a commercial sodium silicate containing 3.26 parts by weight of silica for each part of $Na_2O$; or, in molecular ratios, $Na_2O:SiO_2$ is $1:3.3$. 2.75 parts by weight of such solution are required to one part of the aluminum sulphate solution. To the mixture of these solutions is next added a solution of commercial sodium aluminate, 0.85 parts by weight of a 4.4° Bé. solution containing 2.04 grams $Al_2O_3$ per 100 c. c. are required. The $Al_2O_3$ should equal 60 per cent of the dissolved solid. The zeolite ultimately obtained from these solutions should have the molecular composition $Al_2O_3:SiO_2 = 1:5$. The resulting mother liquor will be somewhat alkaline. The utilization of silica and alumina is practically complete. About 47 per cent of the soda in the mixture reappears as part of the wet gel, the rest forming sodium sulfate.

Assuming commercial sodium aluminate with 50 per cent soluble alumina, commercial aluminum sulfate with 17 per cent soluble alumina and commercial water glass of 40° Bé. carrying $Na_2O$ and $SiO_2$ in the weight ratio of 1:3.26, the subjoined table shows the proportions necessary in making any particular ratio. Making the parts pounds, convenient sized working batches are obtained. The chemicals are dissolved in sufficient water to give jellies, separating gels or gel precipitates, as may be desired.

| Ratio $Al_2O_3:SiO_2$ | Sodium aluminate | Aluminum sulphate | Sodium silicate |
|---|---|---|---|
| Molecules | Weights | Weights | Weights |
| 1:1 | 188.86 | 44.51 | 207 |
| 1:2 | 173.73 | 89.03 | 414 |
| 1:3 | 158.59 | 133.53 | 621 |
| 1:4 | 143.47 | 178.04 | 828 |
| 1:5 | 128.34 | 222.56 | 1,035 |
| 1:6 | 113.20 | 267.06 | 1,242 |
| 1:7 | 98.06 | 311.57 | 1,449 |
| 1:8 | 82.93 | 356.09 | 1,656 |
| 1:9 | 67.79 | 400.59 | 1,863 |
| 1:10 | 52.65 | 445.11 | 2,070 |
| 1:11 | 37.54 | 489.62 | 2,277 |
| 1:12 | 22.40 | 534.12 | 2,484 |
| 1:13 | 7.26 | 578.64 | 2,691 |

It may be noted that in all the above specified reagent proportions the respective quantities of aluminum sulfate and sodium silicate are in a weight ratio of 1 to 4.65 while the ratios of sodium aluminate to aluminum sulfate vary from approximately 4.2 to 1 down to 0.0125 to 1, which is a range of ratios between 12 and 0.036 to 1 on the basis of the respective alumina contents of the aluminate and sulfate as given above. In other words the aluminate supplies 92 per cent of the alumina used in making the low silica zeolite and only 3.5 per cent in the case of the high silica product. For the 1:5 zeolite the aluminate adds 1.7 parts of alumina for each part in the sulfate, about 63 per cent of the alumina being furnished by the aluminate and 37 per cent by the sulfate. It should be noted further that with 4.6 parts of commercial 40° Bé. silicate, which usually contains about 29 per cent $SiO_2$ and 8.9 per cent $Na_2O$, mixed with one part of commercial aluminum sulfate, which as a general rule has about 38 per cent $SO_3$ combined with 17 per cent $Al_2O_3$, the molecular proportions in the sulfate-silicate mixture are approximately:

| | |
|---|---|
| 13.5 | $SiO_2$ |
| 4.0 | $Na_2$ |
| 2.85 | $SO_3$ |
| 1.0 | $Al_2O_3$ |

From these molecular proportions it is clear that the silicate supplies sufficient soda to neutralize the acid of the sulfate, to provide soda in a 1:1 ratio to the $Al_2O_3$ of the sulfate and to leave a small excess, the silica-alumina ratio being more than 13 to 1. Addition of aluminate to the sulfate-silicate mixture lowers the silica-alumina and the silica-soda ratio thereof in exact proportion to the amount of aluminate added; the usual commercial grade of sodium aluminate containing a little more than one $Na_2O$ for each $Al_2O_3$ and thus supplying the additional soda required to combine with the added alumina of the aluminate in zeolite formation; the slight excess of soda over the 1:1 molecular ratio serving to insure an adequate soda content in the gel formed.

With the reagent proportions as set forth in the table, the sulfate-silicate mixture is slightly alkaline and contains the ingredients of a zeolite having approximately a 1:1:13.5 ratio of soda, alumina and silica together with a substantial amount of neutral sodium sulfate, and the aluminate adjusts the silica content of the gel at a ratio between 13 and 1 simply by adding alumina and soda in the proper amount. In other words, reduction of the relative silica content in the zeolite gel product is effected simply by adding aluminate to the sulfate-silicate mixture before gelation. Under such conditions, the soda: alumina ratio of 1:1 is practically self adjusting.

Unless too dilute solutions are employed, a full volume jelly results, but sufficient time is afforded to secure homogeneous admixture prior to its development. When making a 1:1:5 zeolite, if the jelly is not pressed but is dried at a low temperature, it will contain about 33 per cent (on the weight of the zeolite) of sodium sulfate which crystallizes during drying.

By pressing the gel, the amount of crystallizable sulfate is reduced but the reduction cannot go beyond a certain point. These gels, when pressed, carry about 15 per cent dry colloid matter and about 85 per cent water and solutes. In nearly all cases, the pressed gel has about this composition. Full volume jellies may be produced carrying as high as 95.0 per cent mother liquor. But on pressing, they come down to about 85 per cent mother liquor—65 to 70 per cent of the original mother liquor being removed by expression.

The gel formed by pressing and drying, or by drying without pressing, on addition to water snaps or decrepitates in a well known way, forming granules. These granules can be further washed to the extent desired and then directly used in a water softener. Commonly, they are not again dried.

As pointed out, the $Na_2O:Al_2O_3$ ratio in all these wet methods zeolites is tolerably constant. As long as the final mother liquor is not distinctly acid, the soda content in the zeolite will be about right; it takes care of itself. The present invention, in one way of looking at it, may be regarded as a method of putting a certain amount of free silica into solution and then reacting on the silica with required amount of alumina as sodium aluminate. The first action of the aluminum sulfate on the sodium silicate is to set free silica and some alumina in solution or pseudo-solution. This silica and the alumina are brought down together by the alumina from the aluminate of soda. Practically any content of $SiO_2$, within the limits mentioned, can be thus produced. In a general way, the higher ratios of silica give final zeolites which are harder to the feel and also more frangible, than those with lower ratios. Zeolites with silica ratios as low as 1:1:1 or 1:1:2 can be made, but are more or less soft, plastic or pulverulent.

Sulfate of alumina in solution has an acid reaction to most indicators, and to it can be added the required amount of sodium silicate and then the reagent composition is completed by an addition of aluminate of soda. Working in this way the deficiency of soda in the sulfate-silicate mix is made up by the surplus alkali in the aluminate.

As stated, potassium aluminate and potassium silicate are equivalent to, but not better than, the corresponding sodium compounds for the present purposes. The zeolites are, however, bettered by the presence of some potassium in the alkali forming part of the gel and in using sodium compounds, it is sometimes worth while to add a little potash in some form. For example, a little potash alum may be added to the sulfate of alumina. Waste leach liquors from the manufacture of zeolites by dry or furnace methods are usually potassiferous and may be used in making the solutions mentioned.

Instead of aluminum sulfate solution, a solution of any other acid-reacting aluminum salt, such as the chlorid, may be used. Alumina is an amphoteric body, forming saline combinations both with acids and with bases. It will be noted that in the present action alumina is functioning both as a cation and as an anion; alumina in the product comes from both sources. Other amphoteric oxids may be employed in one part of the action or the other; or in both. It is also possible to make mixed zeolites by the use of iron chlorid or sulfate in lieu of aluminum sulfate.

While as stated, the sodium ratio in these zeolites is substantially constant, by the use of the present methods it can be shifted a little, making the zeolite either slightly acid or slightly alkaline as circumstances may make desirable.

While the production of a full volume jelly has been recited, a strong solution being indicated, and this is regarded as most advantageous, yet the principle of successively using an acid-reacting solution containing alumina (or another amphoteric oxid) and an alkaline solution containing alumina, can be utilized in producing zeolites of adjusted ratio whatever the concentration of the solutions; that is, the present process can be used to produce gelatinous precipitates and less than full-volume jellies as well as full-volume jellies.

What I claim is:—

1. In the manufacture of zeolites having an adjusted silica ratio, the process which comprises adding the desired amount of silica in the form of a solution of silicate of soda to a solution of aluminum sulfate in such concentrations and in such proportions as to produce an ungelled solution mixture. And thereafter adding a further amount of alumina to the mixture in the form of a solution of sodium aluminate; the molar ratio of silica to alumina and to soda in the zeolite product being adjusted between 13 and 1 $SiO_2$ to one each of $Al_2O_3$ and $Na_2O$ by inversely varying the relative proportion of the sodium aluminate to the aluminum sulfate put into the reagent mixture, the relative proportions of the three reagents being such as to leave the final mixed liquor slightly alkaline.

2. In the manufacture of zeolites of predetermined silica content by the wet way, a process which comprises admixing sodium silicate solution with a solution of an acid reacting compound of an amphoteric oxid, the sodium silicate being in amount in excess of that sufficient to neutralize the acid of said compound, and then adding a solution of an alkaline reacting compound of an amphoteric oxid in an amount leaving the final mixture slightly alkaline, the molar ratio of the amphoteric oxid to silica in the zeolite product being adjusted between 1:1 and 1:13 by varying the relative proportions of said acid reacting and alkaline reacting compounds.

3. In the manufacture of gel zeolites the process which comprises neutralizing a solution of aluminum sulfate with a solution of sodium silicate, the solutions being of such concentrations and in such proportions as to produce a slow gelling liquid, then adding sodium aluminate solution to said sulfate-silicate solution mixture in an amount relative to the amount of sulfate such that the molecular ratio of alumina to silica in the mixture is adjusted between 1:13 and 1:1 and permitting gel formation.

4. A process of making a water softening zeolite which comprises mixing solutions of aluminum sulfate and sodium silicate in such concentrations and proportions as to produce a slow-gelling mixture and then mixing a solution of sodium aluminate with the sulfate-silicate mixture, the three reagents being in such proportions that the sum of the alkali contents of the silicate and aluminate solutions is in excess of the total quantity required to form neutral sodium sulfate with the sulfuric acid of the aluminum sulfate and to provide in addition one mol $Na_2O$ or its equivalent for each mol $Al_2O_3$ in the final mixture.

5. A process according to claim 4 in which the alkali of the sodium silicate used is sufficient in total amount to neutralize the sulfuric acid of the aluminum sulfate used and to provide in addition one mol of $Na_2O$ or its equivalent for each mol $Al_2O_3$ in the aluminum sulfate, the alkali of the sodium aluminate solution used being slightly in excess of the equivalent of one mole of $Na_2O$ for each mol of $Al_2O_3$ in the aluminate.

6. A process according to claim 4 in which the silicate used is of a grade containing upwards of 3 mols $SiO_2$ to one of $Na_2O$ and such a quantity of aluminate is added to the sulfate-silicate mixture that the product contains a ratio of 5 mols $SiO_2$ to one each of $Al_2O_3$ and $Na_2O$.

7. A process of making water softening zeolites which comprises mixing solutions of aluminum sulfate and sodium silicate in such concentrations and in such proportions as to produce a clear liquid containing silica in solution, then mixing said liquid with a solution of sodium aluminate of a composition approximately corresponding to $Na_2O.Al_2O_3$ and allowing the final mixture to gel, adjusting the molar ratio of the silica and alumina in the zeolite product between 13 and 1 $SiO_2$ to 1 $Al_2O_3$ by varying the relative proportion of the aluminate mixed with the sulfate-silicate solution mixture.

8. In the manufacture by wet methods of water-softening zeolites of adjusted composition, a process which comprises admixing with a solution of sodium silicate solutions of aluminum sulfate and of sodium aluminate in such concentrations and in such proportions as to produce a slow gelling liquid, the relative proportions of said three reagents being such that the molecular sum of the contained $Na_2O$ derived from the aluminate and from the silicate is greater than the total amount necessary to form neutral sodium sulfate from the aluminum sulfate and to supply in addition one mol $Na_2O$ to each mol $Al_2O_3$ in the mixture.

9. In the manufacture by wet methods of water-softening zeolites of adjusted composition, a process which comprises admixing with a solution of sodium silicate solutions of aluminum sulfate and of sodium aluminate in such concentrations and in such proportions as to produce a slow gelling liquid, the relative proportions of said three reagents being such that the molecular sum of the contained $Na_2O$ derived from the aluminate and from the silicate is greater than the total amount necessary to form neutral sodium sulfate from the aluminum sulfate and to supply in addition one mol $Na_2O$ to each mol $Al_2O_3$ in the mixture and the molecular ratio of silica to alumina in the zeolite product being adjusted between 13:1 and 1:1 by adjusting the relative proportion of alumina derived from the aluminate between 3 and 93 per cent of the total alumina supplied to the mixture by both the aluminate and the sulfate.

10. An economic process of making a zeolite of improved chemical and physical properties for water softening purposes which comprises mixing solutions of commercial sodium silicate and of commercial aluminum sulfate in such relative proportions that the silicate provides in the mixture a mol $Na_2O$ for each mol $Al_2O_3$ of the sulfate in addition to sufficient $Na_2O$ to neutralize the $SO_3$ of the sulfate and then lowering the molecular ratio of silica to alumina in the mixture by adding a solution of commercial sodium aluminate of a composition approximating $Na_2O.Al_2O_3$.

11. The process of making water-softening zeolite gels of adjusted silica content from commercial sodium silicate containing upwards of 3 mols $SiO_2$ to one of $Na_2O$ which comprises reacting in solution to form a jelly a quantity of said sodium silicate with quantities of aluminum sulfate and of sodium aluminate adjusted in proportions to give a ratio of silica to alumina and soda in the gel product equivalent to between 5 and 7 molecules of $SiO_2$ to one each of $Al_2O_3$ and $Na_2O$.

12. The process of making water-softening zeolites from commercial sodium silicate containing upwards of 3 mols $SiO_2$ to one of $Na_2O$ which comprises treating in solution a quantity of such sodium silicate with both aluminum sulfate and sodium aluminate and controlling the silica content of the product by adjusting the proportions of alumina supplied respectively by the sulfate and the aluminate, decreasing the silica content by increasing the proportion of alumina supplied by the aluminate and vice versa.

13. In making water-softening zeolites from sodium silicate and both an alkaline and an acid alumina compound the process which comprises mixing solutions of sodium silicate containing the equivalent of at least 3 mols $SiO_2$ to 1 mol $Na_2O$, of sodium aluminate containing $Al_2O_3$ and $Na_2O$ in a molar ratio about 1:1 and of aluminum sulfate, adjusting the reagent proportions so that the sum of the $Na_2O$ of the silicate and of the aluminate is in excess of the total quantity required to form neutral sodium sulfate with the $SO_3$ of the aluminum sulfate and in addition to provide in the mixture one mol $Na_2O$ for each mol $Al_2O_3$ therein.

In testimony whereof, I have hereunto affixed my signature.

WILLIAM McAFEE BRUCE.

---

CERTIFICATE OF CORRECTION.

Patent No. 1,906,202.      April 25, 1933.

WILLIAM McAFEE BRUCE.

It is hereby certified that error appears in the printed specification of the above numbered patent requiring correction as follows: Page 4, line 95, claim 1, for "ture. And" read "ture, and"; and that the said Letters Patent should be read with this correction therein that the same may conform to the record of the case in the Patent Office.

Signed and sealed this 23rd day of May, A. D. 1933.

M. J. Moore.

(Seal)      Acting Commissioner of Patents.

3 mols $SiO_2$ to 1 mol $Na_2O$, of sodium aluminate containing $Al_2O_3$ and $Na_2O$ in a molar ratio about 1:1 and of aluminum sulfate, adjusting the reagent proportions so that the sum of the $Na_2O$ of the silicate and of the aluminate is in excess of the total quantity required to form neutral sodium sulfate with the $SO_3$ of the aluminum sulfate and in addition to provide in the mixture one mol $Na_2O$ for each mol $Al_2O_3$ therein.

In testimony whereof, I have hereunto affixed my signature.

WILLIAM McAFEE BRUCE.

---

CERTIFICATE OF CORRECTION.

Patent No. 1,906,202.   April 25, 1933.

WILLIAM McAFEE BRUCE.

It is hereby certified that error appears in the printed specification of the above numbered patent requiring correction as follows: Page 4, line 95, claim 1, for "ture. And" read "ture, and"; and that the said Letters Patent should be read with this correction therein that the same may conform to the record of the case in the Patent Office.

Signed and sealed this 23rd day of May, A. D. 1933.

M. J. Moore.

(Seal)   Acting Commissioner of Patents.

CERTIFICATE OF CORRECTION.

Patent No. 1,906,202.                          April 25, 1933.

WILLIAM McAFEE BRUCE.

It is hereby certified that error appears in the printed specification of the above numbered patent requiring correction as follows: Page 4, line 95, claim 1, for "ture. And" read "ture, and"; and that the said Letters Patent should be read with this correction therein that the same may conform to the record of the case in the Patent Office.

Signed and sealed this 23rd day of May, A. D. 1933.

M. J. Moore.

(Seal)                                       Acting Commissioner of Patents.